3,291,592
METHOD FOR INCREASING SUGAR CANE YIELD
Arlyn W. Evans, Memphis, Tenn., assignor to E. I. du Pont de Nemours and Company, Wilmington, Del., a corporation of Delaware
No Drawing. Filed Apr. 20, 1964, Ser. No. 361,206
8 Claims. (Cl. 71—2.5)

This invention relates to the use of substituted uracils and derivatives of these uracils as growth modification agents.

According to the present invention, there is provided a method for modifying the growth and yield of crops, particularly sugar cane, employing as an active growth modifying agent at least one compound of the formula:

(1)

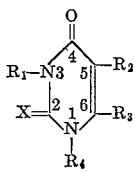

where:

$R_1$ is alkyl of 1 through 10 carbon atoms, substituted alkyl of 1 through 8 carbon atoms, aryl of 5 through 10 carbon atoms, substituted phenyl, aralkyl of 5 through 13 carbon atoms, Substituted aralkyl of 5 through 13 carbon atoms, alkenyl of 3 through 8 carbon atoms, alkynyl of 3 through 8 carbon atoms, cycloalkyl of 3 through 12 carbon atoms, substituted cycloalkyl of 3 through 12 carbon atoms, cycloalkenyl of 4 through 12 carbon atoms, substituted cycloalkenyl of 4 through 12 carbon atoms, cycloalkyl alkyl of 4 through 13 carbon atoms, cycloalkenyl alkyl of 5 through 13 carbon atoms (substituted cycloalkyl) alkyl of 4 through 13 carbon atoms, and (Substituted cycloalkenyl)alkyl of 5 through 13 carbon atoms;

$R_2$ is hydrogen, chlorine, fluorine, bromine, iodine, methyl, ethyl, propyl, butyl, methoxy, ethoxy, propoxy, butoxy, nitro, alkoxymethyl of 2 through 6 carbon atoms, hydroxy alkyl of 1 through 6 carbon atoms, alkenyl of 3 through 6 carbon atoms, thiocyanato, cyano, thiolmethyl methylthiomethyl, phenylthiomethyl, alkylthio of 1 through 4 carbon atoms, bromomethyl, fluoromethyl, chloromethyl, or carboxymethylthiomethyl;

$R_3$ is hydrogen, chlorine, bromine, alkyl of 1 through 5 carbon atoms, chloroalkyl of 1 through 4 carbon atoms, bromoalkyl of 1 through 4 carbon atoms, or alkoxy of 1 through 5 carbon atoms;

$R_4$ is hydrogen, alkyl of 1–5 carbon atoms, substituted alkyl of 1–5 carbon atoms, alkenyl of 2–5 carbon atoms, alkynyl of 3–5 carbon atoms, acyl of 1–10 carbon atoms, substituted acyl of 1–10 carbon atoms, carbamyl of 1–7 carbon atoms, substituted carbamyl of 1–7 carbon atoms, thiocarbamyl of 1–7 carbon atoms, substituted thiocarbamyl of 1–7 carbon atoms, dialkylphosphoryl of 2–6 carbon atoms, dialkylthionophosphoryl of 2–6 carbon atoms, alkylthio of 1–12 carbon atoms, substituted alkylthio of 1–12 carbon atoms, phenylthio of 6–10 carbon atoms, substituted phenylthio of 6–10 carbon atoms, benzylthio of 7–12 carbon atoms, subshtituted benzylthio of 7–12 carbon atoms, or glycosyl; and X is oxygen or sulfur; with the proviso that $R_2$ and $R_3$ can be taken together as —$(CH_2)_n$— to form a ring where $n$ is 3, 4, or 5, and with the further proviso that when $R_2$ is hydrogen $R_1$ is a cycloalkyl of 3–12 carbon atoms, a substituted cycloalkyl of 3–12 carbon atoms, or a cycloalkenyl of 4–12 carbon atoms, a substituted cycloalkenyl of 4–12 carbon atoms, or alkyl of 3–10 carbon atoms.

$R_4$ is shown as attached to the uracil ring in the 1-position. This is done with the understanding that it might be attached to the oxygen or sulfur in the 2-position. Present evidence on this point is inconclusive.

The term "substituted alkyl" for $R_1$ is intended to include such radicals as bromoalkyl of 1 through 10 carbon atoms, chloroalkyl of 1 through 10 carbon atoms, hydroxyalkyl of 1 through 10 carbon atoms, alkoxyalkyl of 2 through 10 carbon atoms, alkoxy carbonyl alkyl of 3 through 10 carbon atoms, cyanoalkyl of 2 through 10 carbon atoms.

Similarly for $R_1$, the terms "aryl" and "substituted aryl" embrace radicals such as phenyl
naphthyl
p-biphenyl
pyridyl
chlorophenyl
bromophenyl
dichlorophenyl
dibromophenyl
fluorophenyl
trichlorophenyl
alkylphenyl of 7 through 11 carbon atoms
dialkylphenyl of 8 through 12 carbon atoms
chloroalkylphenyl of 7 through 10 carbon atoms
nitrochlorophenyl
nitrophenyl
dichloronitrophenyl
chloroalkoxyphenyl of 7 through 11 carbon atoms
trifluoromethylphenyl
alkylnaphthyl of 11 through 16 carbon atoms
chloronaphthyl
tetrahydronaphthyl and
indenyl For $R_1$, the terms "aralkyl" and "substituted aralkyl" are intended to include such radicals as benzyl
phenylalkyl of 8 through 11 carbon atoms (total)
chlorobenzyl
dichlorobenzyl
alkylbenzyl of 8 through 11 carbon atoms (total)
dialkylbenzyl of 9 through 13 carbon atoms (total)
nitrobenzyl
alkoxybenzyl of 8 through 11 carbon atoms (total), and
naphthylmethyl.

For $R_1$, the terms "cycloalkyl," "cycloalkenyl," "cycloalkyl alkyl," and "cycloalkenyl alkyl" will include cyclopropyl
cyclohexyl
cyclohexenyl
cyclohexylalkyl
cyclohexenylalkyl
cyclopentyl
cyclopentenyl
cyclopentylalkyl
cyclopentenylalkyl
norbornyl
norbornenyl
norbornylalkyl
norbornenylalkyl
bicyclo[2,2,2]octyl
bicyclo[2,2,2]octenyl
bicyclo[2,2,2]octylalkyl
bicyclo[2,2,2]octenylalkyl
cyclopropyl
cyclobutyl
cyclooctyl
cyclodedecyl
cyclobutylalkyl cyclobutenyl
cyclobutenylalkyl
hexahydroindanyl
tetrahydroindanyl
hexahydroindenyl
hexahydroindenyl alkyl
tetrahydroindanyl alkyl
hexahydroindanyl alkyl
hexahydro-4,7-methanoindenyl
tetrahydro-4,7-methanoindanyl
hexahydro-4,7-methanoindanyl
hexahydro-4,7-methanoindenyl alkyl
tetrahydro-4,7-methanoindanyl alkyl
hexahydro-4,7-methanoindanyl alkyl
decahydronaphthyl
decahydronaphthyl alkyl
tetrahydronaphthyl
tetrahydronaphthyl alkyl
decahydro-1,4-methanonaphthyl
decahydro-1,4-methanonaphthyl alkyl
octahydro-1,4-methanonaphthyl
octahydro-1,4-methanonaphthyl alkyl
decahydro-1,4,5,8-dimethanonaphthyl
decahydro-1,4,5,8-dimethanonaphthyl alkyl
octahydro-1,4,5,8-dimethanonaphthyl
octahydro-1,4,5,8-dimethanonaphthyl alkyl
fenchyl and
bornyl.

These cyclic substituents can be further substituted with alkyl groups containing 1 through 4 carbon atoms, methoxy, chlorine and bromine.

In Formula 1, the R$_4$ term, "substituted alkyl" is intended to include bromo alkyl 1–5 carbon atoms
chloro alkyl 1–5 carbon atoms
hydroxy alkyl 1–5 carbon atoms
alkoxy alkyl 2–5 carbon atoms
cyano alkyl 2–5 carbon atoms
carboxy alkyl 2–5 carbon atoms
alkoxy carbonyl alkyl of 3–6 carbon atoms
alkyl of 1–5 carbon atoms In the foregoing list, the R$_4$ term, "substituted carbamyl and thiocarbamyl," includes structures of the type

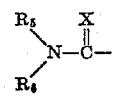

where
R$_5$ and R$_6$ are hydrogen, alkyl from 1 through 4 carbon atoms, phenyl, chlorophenyl, dichlorophenyl, and
X is oxygen or sulfur.

The term "acyl" includes structures of the type

where
R$_7$ is hydrogen, alkyl of 1 through 4 carbon atoms, chloroalkyl of 1 through 4 carbon atoms, polychloroalkyl of 1 through 4 carbon atoms, phenyl, chlorophenyl of 1 through 3 chlorine atoms, benzyl, chlorobenzyl of 1 through 3 chlorine atoms, phenoxymethyl, or chlorophenoxymethyl of 1 through 3 chlorine atoms.

By "substituted phenylthio and benzylthio" is intended to include such radicals for R$_4$ as phenylthio, benzylthio, halophenylthio, nitrophenylthio, alkylphenylthio of 7–10 carbon atoms, chlorobenzylthio, alkylbenzylthio of 8–12 carbon atoms.

By "substituted alkylthio" is intended to include such radicals for R$_4$ as chloroalkylthio of 1–12 carbon atoms, bromoalkylthio of 1–12 carbon atoms, alkylthio of 1–12 carbon atoms.

According to a further embodiment of the invention, addition compounds of the uracils of Formula 1 with an acid having an ionization constant greater than $2\times10^{-5}$ are suitable for use in the method of the invention. These compounds may be represented by the formula (2)

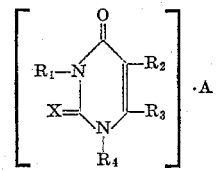

where
R$_1$, R$_2$, R$_3$, R$_4$, and X are defined as above and A is an acid having an ionization constant greater than $2\times10^{-5}$.

Preferred acids for preparing these addition compounds are halogenated aliphatic acids containing from 2 to 5 carbon atoms, halogenated benzoic acids, halogenated phenylacetic acids, halogenated phenoxy acetic acids, organic sulfonic acids, organic phosphoric acids, and inorganic phosphoric acids. These acids are preferred because the uracil addition compounds formed from them show excellent oil solubility. Illustrative of these acids are:

2,3,5-trichlorobenzoic acid
2,3,6-trichlorobenzoic acid
2,3,5,6-tetrachlorobenzoic acid
2,3,5-triiodobenzoic acid
2-methoxy-3,6-dichorobenzoic acid
2-methoxy-3,5,6-trichlorobenzoic acid
2-methyl-3,6-dichlorobenzoic acid
2,5-dichloro-3-aminobenzoic acid
2,5-dichloro-3-nitrobenzoic acid
2,3,6-trichlorophenylacetic acid
2,3,5,6-tetrachloorophenylacetic acid
2-methoxy-3,6-dichlorophenylacetic acid
2,4-dichlorophenoxyacetic acid
2,4,5-trichlorophenoxyacetic acid
phosphoric acid
methane phosphoric acid
phenylphosphoric acid Most preferred due to the ease of preparation of their addition compounds are acids of the formula

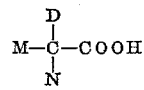

wherein D is halogen; M is hydrogen, halogen, alkyl of from 1 to 3 carbon atoms, or haloalkyl; and N is hydrogen, halogen or alkyl. Illustrative of these acids are:

chloroacetic acid
dichloroacetic acid
trichloroacetic acid
bromoacetic acid
dibromoacetic acid
tribromoacetic acid
trifluoroacetic acid
α,α-dichloropropionic acid
α,α-dibromopropionic acid
α,α,β-trichloropropionic acid
α,α,β-trifluoropropionic acid
α,α-dichlorobutyric acid
α,β-dichloroisobutyric acid
α,β,β-trichloroisobutyric acid
α,α-dichlorovaleric acid Also suitable for the invention are addition compounds formed from acids of the formula R$_8$SO$_3$H, where R$_8$ is an aliphatic hydrocarbon radical, an aromatic hydrocarbon radical, or a halogen or alkyl substituted aromatic radical. Illustrative of these acids are:

methanesulfonic acid
ethanesulfonic acid
dodecylsulfonic acid
p-tolylsulfonic acid benzenesulfonic acid
dodecylbenzenesulfonic acid
2,4,6-trichlorobenzenesulfonic acid
napththalene-β-sulfonic acid According to a still further embodiment of the invention, complexes of the uracils of formula (1) with phenol and substituted phenols are suitable for use in the method of the invention. These complexes have the formula (3) 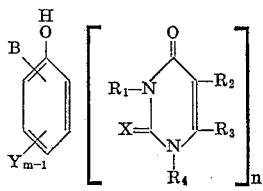

where:

$R_1$, $R_2$, $R_3$, and $R_4$ are as defined above;

B is hydrogen, bromine, chlorine, nitro, alkyl or 1 through 3 carbon atoms or —$OR_9$ radical where $R_9$ is alkyl of 1 through 3 carbon atoms, Y is chlorine or alkyl of 1 through 3 carbon atoms, m is a number 1 through 5, and n is ½, 1, or 2.

According to a still further embodiment of the invention, 1:1 addition of the uracil of Formula 1 in which $R_4$ is hydrogen with nitrogenous bases are found suitable for the method of the invention. These compounds may be represented by the formula (4) 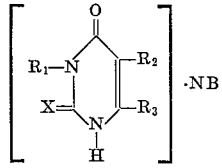

where:

$R_1$, $R_2$, $R_3$, and X are as defined as above, and NB is a nitrogenous base having an ionization constant $K_b$ of greater than $10^{-9}$ in water.

Suitable nitrogenous bases are substituted, unsubstituted, cyclic and acylic amines, amidines, and guanidines. The amines can be primary, secondary, or tertiary amines, polyamines, arylamines, or heterocyclicamines. Illustrative of such amines are:

sec.-butylamine
2-amino-2-methyl-1,3-propanediol
trimethylenediamine
ethanolamine
dodecylamine
ethylenediamine
hexamethylenediamine
cocoadiamine
tallowdiamine
hexamethyleneimine
cyclohexylamine
methoxypropylamine
methylamine
dimethylamine
trimethylamine
ammonia
ethylamine
propylamine
butylamine
octylamine
pyridine
piperidine
tetramethylguanidine
acetamidine
benzylamine
diethylenediamine
2-aminobutanol-1
2-aminooctanol-1

Various salts of the substituted uracils of Formula 1 where $R_4$ is hydrogen can also be used for the purposes of the present invention. By "salts" is meant those compounds formed by reacting these uracils with such cations as sodium, potassium, lithium, calcium, magnesium, barium strontium, iron, manganese, and quaternary ammonium.

Preparation of the substituted uracils of Formula 1 and the above-defined derivatives of substituted uracil compounds is disclosed in Belgium Patent 625,897 issued June 10, 1963, assigned to my assignee.

It has been found in accordance with the present invention that the substituted uracils of Formula 1 and the above-defined derivatives of substituted uracils may be used as growth modification agents for crops exhibiting particularly outstanding and surprising results when applied to sugar cane. When applied to growing cane, it is found that these compounds suppress the growth of the terminal head of the plant and inhibit flowering. Concurrently, the treatment of cane with these compounds has the effect of artificially ripening the cane. Apparently, the treatment with these unracil compounds initiates the conversion of other carbohydrates present in the sugar cane to sucrose, thereby significantly increasing the yield of sugar from the crop.

Treatment of the sugar cane is preferably appplied at from 5 to 35 days before the scheduled harvest of the cane with 8 to 28 days being the most preferred interval between treatment and harvest.

The amount of these active compounds to be used in the method of the invention may vary between relatively wide limits and will depend in part on the particular substituted uracil or uracil derivative within the invention which is selected for treatment. In general, application will be made at the rate of from about 2 to 10 pounds per acre, although smaller amounts may be used with significant effect. Amounts over 10 pounds per acre offer little practical advantage and usually cannot be justified economically.

Application of these active compounds will be made for purposes of the present invention by incorporating them in sufficient carrier to assure that the active agent reaches the blades of each plant. The preferred carrier for the substituted uracil or substituted uracil derivative agent is water containing about 0.3 to 2% by weight surfactant. Other suitable carriers for application of the active agent are oil, oil in water emulsions, or water in oil emulsion. The term "surface-active agent" is intended to include wetting agents, dispersing agents, suspending agents, and emulsifying agents which may be either of the anionic, cationic, or nonionic type. Surface-active agents suitable for use are set forth in "Detergents and Emulsifiers . . . Up To Date," 1962, John W. Mc-Cutcheon, Inc., Morristown, New Jersey. Other surface-active agents which can be used are listed in U.S. Patents 2,139,276; 2,412,510; 2,426,417; and 2,655,447.

The following examples are given to further illustrate the invention, all parts and proportions being by weight unless indicated otherwise.

*Example 1*

Five pounds of an 80% wettable powder formulation of 5-bromo-3-sec.-butyl-6-methyluracil is slurried and diluted with water to a volume of 50 gals. One-half gal. of dodecyl ether of polyethylene glycol is added to the mixture. This material is sprayed over an acre of sugar cane 14 days before it is ready for harvest. A hydraulic sprayer with excellent agitation, either mechanical or hydraulic, is used for this application. Care is taken to obtain uniform coverage of the cane plants.

This treatment suppresses terminal growth of the cane plant and inhibits flowering. It also causes an increase in the sucrose content of younger nodes of the stalk. The net effect of the treatment is to increase the yield of sucrose when the cane is harvested two weeks later.

When applied in the same manner, the following chemicals give this type effect:

5-bromo-3-tert.-butyl-6-methyluracil;
3-tert.-butyl-5-chloro-6-methyluracil;
5-chloro-3-sec.-butyl-6-methyluracil;
5-bromo-3-(1-ethylpropyl)-6-methyluracil;
5-chloro-3-(1-ethylpropyl)-6-methyluracil; or
3-cyclohexyl-6-methyl-1-trichloromethylmercapturacil.

*Example 2*

5-bromo-3-isopropyl-6-methyluracil in the form of a wettable powder is applied to sugar cane at the rate of 3 to 6 pounds/acre about twenty days before the cane harvest is planned. The application is made in 25 gals. of water containing 0.5% (w/w) of a mixture of alkylarylpolyoxyethylene glycols; free fatty acids and isopropanol. The material is kept suspended and sprayed in a manner which covers the treated can plants uniformly.

This treatment results in an increase in the yield of sucrose from the treated plants.

Substitution of any one of the following compounds for the uracil above will give a similar type effect:

3-tert.-butyl-6-methyluracil;
5-bromo-3-cyclohexylmethyl-6-methyluracil;
5-chloro-3-cyclohexylmethyl-6-methyluracil;
3-norbornyl-6-methyluracil;
3-(3a,4,5,6,7,7a - hexahydro-4,7-methanoinden - 5 - yl)-6-methyluracil;
5,5-dichloro-6-ethoxy-3-isopropyl-6-methylhydrouracil; or
5-bromo-3-cyclohexyl-1,6-dimethyluracil.

*Example 3*

A complex of 5-bromo-3-sec.-butyl-6-methyluracil and trisodium phosphate is dissolved in water in a quantity to give 4 pounds of the substituted uracil complex in each 10 gallons of solution. Dodecyl ether of polyethylene glycol is added to equal 1% (w/w) of the solution. Using airplane, this solution is sprayed on sugar cane about 20 days before harvest at the rate of 10 gal./A.

This treatment inhibits flowering, suppresses terminal growth and causes an increase in the sucrose content of the treated cane stalks. When it is harvested, the yield of cane sugar in increased. When any one of the following compounds is substituted for the uracil cited above similar types results are obtained:

5-chloro-3-sec.-butyl-6-methyluracil;
5-chloro-3-isopropyl-6-methyluracil;
3-cyclohexyl-5,6-trimethyleneuracil;
5-bromo-3-phenyluracil;
5-bromo-6-ethyl-3-isopropyluracil

*Example 4*

Four to six pounds of 5-bromo-3-sec.-butyl-6-methyluracil, sodium salt is dissolved in 20 gals. of water and 1% (w/w) of polyoxyethylene thioether added. This material is sprayed on an acre of sugar cane about 15 to 25 days before harvest is planned.

This treatment inhibits growth of the terminal and flower formation. Also, it increases the sucrose content of the younger nodes of the can stalk. At harvest, the treated plants give an excellent yield of can sugar.

The other substituted uracils of this case which have hydrogen on the 1-nitrogen will form sodium salts. These uracils may be used in the manner described above and will give similar results.

*Example 5*

A 1:1 complex of 5-bromo-3-sec.-butyl-6-methyluracil and 2,3,6-trichlorobenzoic acid is prepared. Four to six pounds of this is dissolved in 20 gals. of oil. This solution is applied to sugar cane at 20 gal./A. eighteen days before harvest is planned.

This treatment prevents flowering and suppresses the growth of the terminal bud of cane. When the cane is harvested, treated plants yield more sucrose than similar sugar cane not treated.

*Example 6*

A 1:1 complex containing 5-bromo - 3 - isopropyl-6-methyluracil and trichloroacetic acid is dissolved in aromatic oil at the rate of 8 lbs. of material per 10 gals. of oil. This oil solution is sprayed on sugar cane at the rate of 10 gal./A. about 15 to 20 days before harvest.

The treatment retards flowering and the growth of the terminal bud on sugar cane. When the cane is harvested the yield of sucrose is increased.

*Example 7*

A liquid is prepared containing 25% 5-bromo-3-isopropyl-6-methyluracil, 63% dodecylbenzene sulfonic acid, and 12% xylene. This material is emulsified with water at the rate of 5 lbs. of substituted uracil for each 25 gals. of water. This emulsion is applied to sugar cane at the rate of 5 lbs. of uracil per acre 20 days before harvest.

The treatment suppresses the terminal growth and flowering of sugar cane. When harvested, the treated cane yields more sucrose than similar fields of untreated plants.

Since many different embodiments of the invention may be made without departing from the spirit and scope thereof, it is to be understood that the invention is not limited by the specific illustrations except to the extent defined in the following claims.

I claim:

1. A method for modifying the growth of sugar cane and increasing its yield of sugar comprising applying to sugar cane plants from 5 to 35 days prior to harvest, an effective amount of at least one compound selected from the group consisting of
   (a) compounds of the formula

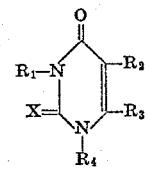

wherein
   $R_1$ is selected from the group consisting of
      alkyl of 1 through 10 carbon atoms; substituted alkyl of 1 through 8 carbon atoms wherein said substituent is selected from the group consisting of bromine, chlorine, hydroxy, alkoxy, alkoxylcarbonyl and cyano; aryl of 5 through 10 carbon atoms; substituted phenyl wherein said substituent is selected from the group consisting of chlorine, bromine, fluorine, alkoxy, alkyl and nitro; aralkyl of 5 through 13 carbon atoms; substituted aralkyl of 5 through 13 carbon atoms wherein said substituent is selected from the group consisting of chlorine, nitro, alkyl and alkoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkyl alkyl of 4 through 13 carbon atoms; cycloalkenyl alkyl of 5 through 13 carbon atoms; (substituted cycloalkyl)alkyl of 5 through 13 carbon atoms wherein said substituent is selected from the group consisting of bromine, chlorine, methoxy, and alkyl; and (substituted cycloalkenyl)alkyl of 5 through 13 carbon atoms wherein said substituent is selected from the group consisting of bromine, chlorine, methoxy, and alkyl;
   $R_2$ is selected from the group consisting of hydrogen, chlorine, fluorine, bromine, iodine, methyl, ethyl, propyl, butyl, methoxy, ethoxy, propoxy, butoxy, nitro, alkoxymethyl of 2 through 6 carbon atoms, hydroxyalkyl of 1 through 6 carbon atoms, alkenyl of 3 through 6 carbon atoms, thiocyanato, cyano, thiolmethyl, methylthiomethyl, phenylthiomethyl, alkylthio of 1 through 4 carbon atoms, bromomethyl, fluoromethyl, chloromethyl, or carboxymethylthiomethyl;

$R_3$ is selected from the group consisting of hydrogen, chlorine, bromine, alkyl of 1 through 5 carbon atoms, chloroalkyl of 1 through 4 carbon atoms, bromoalkyl of 1 through 4 carbon atoms, or alkoxy of 1 through 5 carbon atoms;

$R_4$ is selected from the group consisting of hydrogen; alkyl of 1 through 5 carbon atoms; substituted alkyl of 1 through 5 carbon atoms wherein said substituent is selected from the group consisting of bromine, chlorine, hydroxy, alkoxy, cyano, carboxy and alkoxycarbonyl; alkenyl of 2 through 5 carbon atoms; alkynyl of 3 through 5 carbon atoms; acyl of 1 through 10 carbon atoms; substituted acyl of 1 through 10 carbon atoms wherein said substituent is selected from the group consisting of chlorine and alkoxy; carbamyl of 1 through 7 carbon atoms; substituted carbamyl of 1 through 7 carbon atoms wherein said substituent is chlorine; thiocarbamyl of 1 through 7 carbon atoms; substituted thiocarbamyl of 1 through 7 carbon atoms wherein said substituent is chlorine; alkylthio of 1 through 12 carbon atoms; substituted alkylthio of 1 through 12 carbon atoms wherein said substituent is selected from the group consisting of chlorine and bromine; phenylthio of 6 through 10 carbon atoms; substituted phenylthio of 6 through 10 carbon atoms wherein said substituent is selected from the group consisting of halogen, nitro, and alkyl; benzylthio of 7 through 12 carbon atoms; substituted benzylthio of 7 through 12 carbon atoms wherein said substituent is selected from the group consisting of halogen, nitro and alkyl; or glycosyl; and X is selected from the group consisting of oxygen or sulfur; with the proviso that $R_2$ and $R_3$ can be taken together as $-(CH_2)_n-$ to form a ring wherein $n$ is an integer of from 3 through 5, and with the further proviso that when $R_2$ is hydrogen, $R_1$ is selected from the group consisting of cycloalkyl of 3 through 12 carbon atoms, cycloalkenyl of 4 through 12 carbon atoms, and alkyl of 3 through 10 carbon atoms;

(b) compounds of the formula

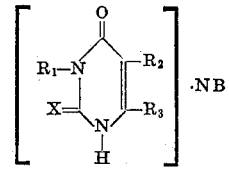

where
$R_1$, $R_2$, $R_3$, $R_4$ and X are defined as above and A is an acid having an ionization constant greater than $2 \times 10^{-5}$;

(c) compounds of the formula

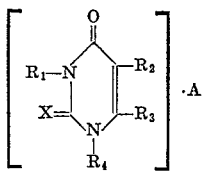

where
$R_1$, $R_2$, $R_3$, $R_4$ and X are defined as above and B is selected from the group consisting of hydrogen, bromine, chlorine, nitro, alkyl of 1 through 3 carbon atoms and $-OR_9$ radical where $R_9$ is alkyl of 1 through 3 carbon atoms, Y is selected from the group consisting of chlorine and alkyl of 1 through 3 carbon atoms, $n$ is selected from the group consisting of ½, 1 and 2;

(d) compounds of the formula

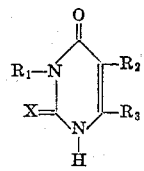

where
$R_1$, $R_2$ $R_3$ and X are defined as above, and NB is a nitrogeneous base having an ionization constant $K_b$ of greater than $10^{-9}$ in water, and (e) salts of the compounds of the formula

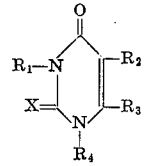

where
$R_1$, $R_2$, $R_3$ and X are defined as above, and the cation is selected from the group consisting of sodium, potassium, lithium, calcium, magnesium, barium, strontium, iron, manganese, and quaternary ammonium.

2. A method of modifying the growth of sugar cane and increasing its yield of sugar comprising applying to sugar cane plants from 5 to 35 days prior to harvest, an effective amount of at least one compound of the formula

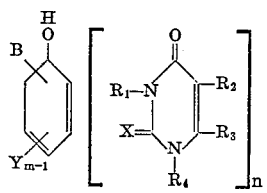

wherein $R_1$ is selected from the group consisting of alkyl of 1 through 10 carbon atoms; substituted alkyl of 1 through 8 carbon atoms wherein said substituent is selected from the group consisting of bromine, chlorine, hydroxy, alkoxy, alkoxyl-carbonyl and cyano; aryl of 5 through 10 carbon atoms; substitued phenyl wherein said substituent is selected from the group consisting of chlorine, bromine, fluorine, alkoxy, alkyl and nitro; aralkyl of 5 through 13 carbon atoms; substituted aralkyl of 5 through 13 carbon atoms wherein said substituent is selected from the group consisting of chlorine, nitro, alkyl and alkoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkyl alkyl of 4 through 13 carbon atoms; cycloalkenyl alkyl of 5 through 13 carbon atoms; (substituted cycloalkyl)alkyl of 5 through 13 carbon atoms wherein said substituent is selected from the group consisting of bromine, chlorine, methoxy and alkyl; and (substituted cyloalkenyl) alkyl of 5 through 13 carbon atoms wherein said substituent is selected from the group consisting of bromine, chlorine, methoxy and alkyl;

$R_2$ is selected from the group consisting of hydrogen, chlorine, fluorine, bromine, iodine, methyl, ethyl, propyl, butyl, methoxy, ethoxy, propoxy, butoxy, nitro, alkoxymethyl of 2 through 6 carbon atoms, hydroxyalkyl of 1 through 6 carbon atoms, alkenyl of 3 through 6 carbon atoms, thiocyanato, cyano, thiolmethyl, methythiomethyl, phenylthiomethyl, alkylthio of 1 through 4 carbon atoms, bromomethyl, fluoromethyl, chloromethyl, or carboxymethylthiomethyl;

$R_3$ is selected from the group consisting of hydrogen, chlorine, bromine, alkyl of 1 through 5 carbon atoms, chloroalkyl of 1 through 4 carbon atoms, bromoalkyl of 1 through 4 carbon atoms, or alkoxy of 1 through 5 carbon atoms;

$R_4$ is selected from the group consisting of hydrogen; alkyl of 1 through 5 carbon atoms; substituted alkyl of 1 through 5 carbon atoms wherein said substituent is selected from the group consisting of bromine, chlorine, hydroxy, alkoxy, cyano, carboxy, and alkoxycarbonyl; alkenyl of 2 through 5 carbon atoms; alkenyl of 3 through 5 carbon atoms; acyl of 1 through 10 carbon atoms; substituted acyl of 1 through 10 carbon atoms wherein said substituent is selected from the group consisting of chlorine and alkoxy; carbamyl of 1 through 7 carbon atoms; substituted carbamyl of 1 through 7 carbon atoms wherein said substituent is chlorine; thiocarbamyl of 1 through 7 carbon atoms; substituted thiocarbamyl of 1 through 7 carbon atoms wherein said substituent is chlorine; alkylthio of 1 through 12 carbon atoms; substituted alkylthio of 1 through 12 carbon atoms wherein said substituent is selected from the group consisting of chlorine and bromine; phenylthio of 6 through 10 carbon atoms; substituted phenylthio of 6 through 10 carbon atoms wherein said substituent is selected from the group consisting of halogen, nitro, and alkyl; benzylthio of 7 through 12 carbon atoms; substituted benzylthio of 7 through 12 carbon atoms wherein said substituent is selected from the group consisting of halogen, nitro and alkyl; or glycosyl; and X is selected from the group consisting of oxygen or sulfur; with the proviso that $R_2$ and $R_3$ can be taken together as $-(CH_2)_n-$ to form a ring wherein $n$ is an integer of from 3 through 5, and with the further proviso that when $R_2$ is hydrogen, $R_1$ is selected from the group consisting of cycloalkyl of 3 through 12 carbon atoms, cycloalkenyl of 4 through 12 carbon atoms, and alkyl of 3 through 10 carbon atoms.

3. The method of claim 1 wherein the active compound is applied at a rate of 2 to 10 pounds of said compound per acre of sugar cane plants.

4. The method of claim 1 in which 5-bromo-3-sec.-butyl-6-methyluracil is the active compound.

5. The method of claim 1 in which 5-bromo-3-isopropyl-6-methyluracil is the active compound.

6. The method of claim 1 in which 5-bromo-3-tert.-butyl-6-methyluracil is the active compound.

7. The method of claim 1 in which 5-chloro-3-sec.-butyl-6-methyluracil is the active compound.

8. The method of claim 1 in which 5-chloro-3-cyclohexylmethyl-6-methyluracil is the active compound.

References Cited by the Examiner

UNITED STATES PATENTS 3,224,865  12/1965  Carlson _____ 71—2.6

FOREIGN PATENTS 1,270,771  7/1961  France.

LEWIS GOTTS, *Primary Examiner.*

JAMES O. THOMAS, JR., *Examiner.*